J. H. CALER & C. M. MERRICK.
POST-HOLE BORER.

No. 181,036. Patented Aug. 15, 1876.

Attest:
D. H. Green
George Thom

Inventors:
John H. Caler
C. M. Merrick

By their atty
Charles E. Foster

UNITED STATES PATENT OFFICE.

JOHN H. CALER, OF FALLSTOWN, AND CHARLES M. MERRICK, OF NEW BRIGHTON, PENNSYLVANIA.

IMPROVEMENT IN POST-HOLE BORERS.

Specification forming part of Letters Patent No. 181,036, dated August 15, 1876; application filed June 28, 1876.

*To all whom it may concern:*

Be it known that we, JOHN H. CALER and CHARLES M. MERRICK, of Fallstown and New Brighton, Beaver county, Pennsylvania, have invented an Improved Post-Hole Borer, of which the following is the specification:

The object of our invention is a post-hole borer constructed, as fully described hereafter, to insure an easy and rapid penetration of the earth, to bore openings of different dimensions, regulate the extent of the cut, and facilitate and reduce the expense of the manufacture of the implement.

Figure 2:
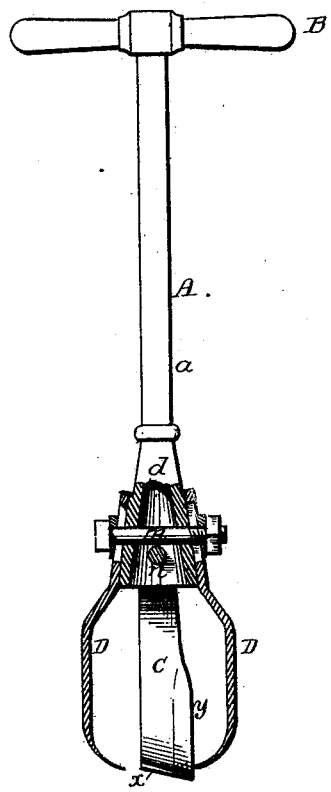
Figure 4:
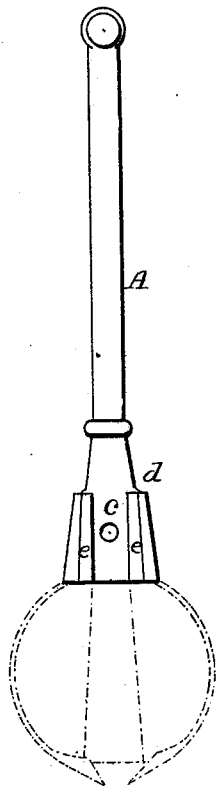
Figure 1:
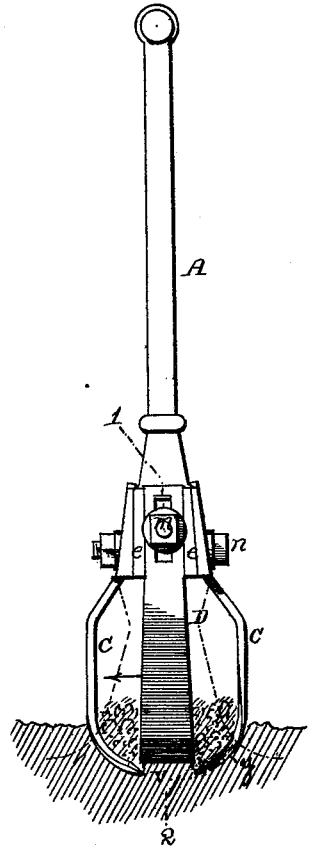
Figure 3:
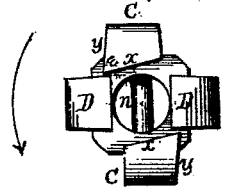

In the accompanying drawing, Figure 1 is a side elevation of the auger or borer; Fig. 2, an elevation, partly in section, on the line 1 2, Fig. 1; Fig. 3, an inverted plan view of Fig. 2; Fig. 4, an external view of the handle, and Fig. 5 an end view of the handle.

The handle A may be of wood, but is preferably of iron, the shank $a$ consisting of a tube with a socket at the upper end for a transverse hand-bar, B, and a hollow head, $d$, at the lower end, said head having four inclined faces, $c$, on each of which are side ribs $e$ $e$.

To the head $d$ are secured, by transverse bolts $m$ $n$, two cutters, C C, and two carriers, D D, the cutters and carriers alternating, and the upper ends of each being slotted for the passage of the bolt, and fitting between the ribs $e$ $e$. Each cutter consists of a steel blade, curved at the lower end, sharpened at one edge, $y$, and with an inclined lower edge, $x$, the lowest point being where it intersects the edge $y$, forming an angular point, $w$.

The carriers may be of iron, corresponding in general outline to the cutters, but not so far separated, nor extending so low, and with straight lower edges; or metal bars or prongs, bent to correspond to the cutters, may be substituted for the blades D.

When the parts are arranged as shown in Figs. 1, 2, and 3, and the implement is turned in the direction of the arrow, Figs. 1 and 3, the lower angular points $w$ will cut and penetrate the ground, forming an annular groove, which is deepened and widened as the rotation is continued, the edges $y$ cutting the sides, and the edges $x$ the bottom, of the opening, leaving a core, $v$, as shown in Fig. 1.

The ribs $e$ $e$ have parallel inner sides or faces, against which bear the side edges of the blades, the ribs receiving the strains without any tendency to force the blades outward, so that the duty of the bolts $m$ $n$ is merely to clamp the blades to the faces of the handle.

When earth has been bored to a depth equal to the projecting portion of the blades, the tool is tilted to break the core, and is raised, the cutters and carriers together grasping and confining the entire body of loose earth, which is detached by striking the implement upon any hard substance.

The distance between the blades, and consequently the diameter of the bore, may be regulated by adjusting the blades upon the inclined faces $d$.

By the combination of the cutters and carrier-blades the implement is rendered as efficient as one having four cutters, while the cost is less, owing to the carriers being of iron.

The peculiar form of the cutters, with the angular cutting-points $w$ projecting downward and outward, insures a rapid and easy penetration of hard earths, the depth of the cut at each revolution being regulated by the extent to which the cutter-blades project beyond the lower edges of the carriers.

Figure 5:
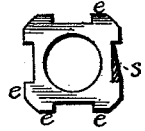

It will be apparent that the head $d$ may have parallel sides, and that wedges may be used to regulate the positions of the blades, either to determine the diameter of the hole or to compensate for wear; or that the same effect may be produced by the use of wedges $s$, Fig. 5, throwing out the cutting-edges.

A further advantage from the combination of cutters and carriers results in the greater distances to which the lower edges of the cutters may be separated, thus permitting large stones to readily pass into the tool.

It will be apparent that the two adjustable cutters may in some instances be used without the carriers, and that blades differing in shape may be employed, as blades semicircular in form, as shown in dotted lines, Fig. 4, or of any other suitable shape—for instance, we have in some cases worked effectively with the cutters C C reversed, in the position shown in dotted lines, Fig. 1. Instead of the blades the head may be slotted.

Without, therefore, confining ourselves to the precise construction of parts shown and described,

We claim—

1. The combination, in a post-hole borer, of a handle, two or more cutting blades, secured in fixed positions, and appliances for adjusting the blades upon said handle, to regulate the diameter of the opening cut, substantially as set forth.

2. The combination of the handle, cutters C C, arranged upon opposite sides thereof, and alternating carriers D D, substantially as and for the purpose set forth.

3. The cutters C and carriers D, adjustable upon the handle in respect to each other, for the purpose of regulating the extent of the cut, substantially as set forth.

4. The cutters C, curved at the lower ends, and having sharpened edges $x$ $y$, the edge $x$ being straight and inclined downward and forward, substantially as set forth.

5. The handle described, provided with the head $b$, having flat inclined faces, each with ribs having parallel sides forming bearings for the edges of the adjustable blades, as set forth.

6. The handle, provided with a head, $d$, having inclined faces $c$, and with blades adjustable on said faces, substantially as and for the purpose set forth.

In testimony whereof we have signed our names to this specification in the presence of two subscribing witnesses.

JOHN H. CALER.
C. M. MERRICK.

Witnesses:
JOB WHYSALL, Jr.,
G. L. EBERHART.